A. J. CAWSE.
FLEXIBLE SHAFT.
APPLICATION FILED DEC. 23, 1920.

1,437,493.

Patented Dec. 5, 1922.

Inventor
Alfred James Cawse,

Witness
Elsie J. Lukins

By Clifton C. Hallowell
Attorney

Patented Dec. 5, 1922.

1,437,493

UNITED STATES PATENT OFFICE.

ALFRED JAMES CAWSE, OF PRINCE BAY, NEW YORK, ASSIGNOR TO THE S. S. WHITE DENTAL MANUFACTURING COMPANY, A CORPORATION OF PENNSYLVANIA.

FLEXIBLE SHAFT.

Application filed December 23, 1920. Serial No. 432,675.

*To all whom it may concern:*

Be it known that I, ALFRED JAMES CAWSE, a citizen of the United States, and a resident of Prince Bay, in the county of Richmond, State of New York, have invented certain new and useful Improvements in Flexible Shafts, of which the following is a specification, reference being had to the accompanying drawings.

My invention relates particularly to that class of flexible shafts in which a rotary flexible cable or shaft is disposed in a sheath or casing which serves as a supporting bearing, and is especially directed to the means of connection between said flexible cable or shaft and a driving or driven element of the device to which said shaft is connected.

The principal objects of my invention are to provide such a connection between a flexible shaft and a driving or driven element as to afford a free relative axial movement between said shaft and said element and to provide means whereby said shaft and said element may be readily connected and disconnected.

Other objects of my invention are to provide a connection between a flexible shaft and a driving or driven element, with means to prevent their accidental separation, yet affording a free relative axial movement of said parts.

Specifically stated, the form of my invention as hereinafter described comprises a flexible shaft having a terminal shank provided with a radially projecting lug forming a spline engaged in a hollow slotted connector engaging said shaft with the driving or driven element of the device to which said shaft may be connected, said lug being engaged in the slot of said connector for axial movement therein, and said connector being provided with a projecting lug arranged to restrict the slot therein and prevent the accidental displacement of said spline therefrom.

My invention also includes all of the various novel features of construction and arrangement as hereinafter more definitely specified.

Figure 1:
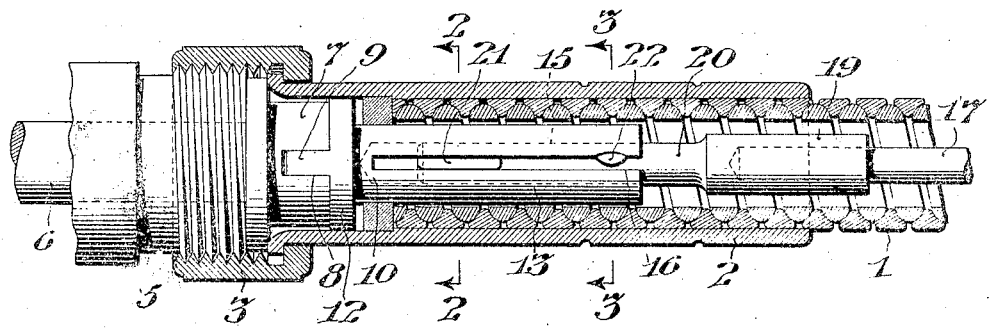
Figure 2:
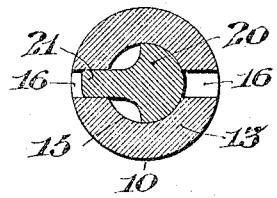
Figure 3:
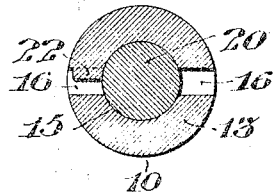

In the accompanying drawings, Figure 1 is a central longitudinal sectional view of a cable terminal connection showing a convenient embodiment of my invention, certain of the parts being shown in elevation for convenience of illustration; Fig. 2 is an enlarged transverse sectional view of the structure shown in Fig. 1, taken on the line 2—2 in Fig. 1; and Fig. 3 is a transverse sectional view taken on the line 3—3 in Fig. 1.

In said figures, the sheath or casing 1 is provided with a terminal sleeve 2 having the nut 3 arranged to engage the bearing 5 of the shaft 6 of a driving or driven element which comprises a terminal member 7 having the slot 8 arranged to receive the tongue 9 of the connector 10, which is provided with a flange 12 and has the hollow barrel 13 providing a bore 15 and having diametrically opposite slots 16 co-extensive with said bore.

The flexible shaft 17 is mounted to rotate in the sheath or casing 1 and is provided with a terminal thimble 19 having a shank 20 extended into the bore 15 of the barrel 13 and provided with a radially extended lug forming a spline 21 projecting into the slot 16 and arranged to prevent relative rotation of said flexible shaft 17 and the driving or driven shaft 6, but permitting the free axial relative movement of the same.

The barrel 13 of the connector 10 has the edge of its slot 16 staked to afford a lug 22 projecting into said slot 16 sufficiently to prevent the accidental displacement of the spline 21 therefrom, yet permitting said spline to pass when so forced as to slightly spring the bifurcated barrel apart when sufficient pressure is brought to bear to separate the shank 20 of the terminal thimble 19 from the barrel 13 of the connector 10.

My invention is advantageous in that the flexible cable may be provided with a readily removable connector which is longitudinally slidable thereon and which is prevented from accidental displacement therefrom.

I do not desire to limit my invention to the precise details of construction and arrangement as herein set forth as it is obvious that various modifications may be made therein without departing from the essential features of my invention as defined in the appended claims.

Having thus described my invention, I claim:—

1. A connection for a driving or driven element and a flexible shaft comprising a terminal shank provided with a spline, including a connector comprising a barrel provided with a bore and slotted walls arranged to receive said shank and its spline, and having a projection extending into said slot arranged to prevent the accidental displacement of said spline from the slot in said walls.

2. A connection for a driving or driven element and a flexible shaft comprising a terminal shank provided with a spline, including a connector comprising a barrel provided with a bore and slotted walls arranged to receive said shank and its spline, the wall of said barrel being staked to provide a projection extending into said slot to prevent the accidental displacement of said spline therefrom.

3. A connection for a driving or driven element having a terminal member provided with a slot, and a flexible shaft having a terminal shank provided with a spline, comprising a connector having a tongue fitted in said slot, and a hollow bifurcated barrel arranged to receive said shank with its spline disposed between the bifurcations, one of which is staked to provide a projection arranged to prevent the accidental separation of said shank and connector.

In witness whereof, I have hereunto set my hand this 21st day of December, A. D. 1920.

ALFRED JAMES CAWSE.

Witnesses:
SAMUEL R. BARTON,
CLIFTON C. HALLOWELL.